(12) United States Patent
Liu et al.

(10) Patent No.: US 12,218,722 B2
(45) Date of Patent: Feb. 4, 2025

(54) ANTENNA PORT INDICATION METHOD, TERMINAL AND NETWORK-SIDE DEVICE

(71) Applicant: DATANG MOBILE COMMUNICATIONS EQUIPMENT CO., LTD., Beijing (CN)

(72) Inventors: Zhengxuan Liu, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/799,263

(22) PCT Filed: Dec. 15, 2020

(86) PCT No.: PCT/CN2020/136559
§ 371 (c)(1),
(2) Date: Aug. 11, 2022

(87) PCT Pub. No.: WO2021/159851
PCT Pub. Date: Aug. 19, 2021

(65) Prior Publication Data
US 2024/0187059 A1    Jun. 6, 2024

(30) Foreign Application Priority Data
Feb. 14, 2020    (CN) .......................... 202010093931.6

(51) Int. Cl.
*H04B 7/06*      (2006.01)
*H04B 7/0456*    (2017.01)
(Continued)

(52) U.S. Cl.
CPC ......... *H04B 7/0608* (2013.01); *H04B 7/0469* (2013.01); *H04B 7/0626* (2013.01);
(Continued)

(58) Field of Classification Search
CPC ..... H04W 72/23; H04W 24/10; H04W 24/08; H04W 74/0833; H04W 72/20;
(Continued)

(56) References Cited

U.S. PATENT DOCUMENTS

| 9,414,224 B1* | 8/2016 | Schmidt | ................ G06F 3/048 |
| 2014/0086285 A1* | 3/2014 | Yang | ................ H04B 7/0417 |
| | | | 375/219 |

(Continued)

FOREIGN PATENT DOCUMENTS

| CN | 108631847 A | 10/2018 |
| CN | 109314562 A | 2/2019 |

(Continued)

OTHER PUBLICATIONS

European Patent Office, the Extended European Search Report Issued in Application No. 20918777.2, Feb. 6, 2024, Germany, 7 pages.

(Continued)

*Primary Examiner* — Eva Y Puente
(74) *Attorney, Agent, or Firm* — Kilpatrick Townsend & Stockton LLP

(57) ABSTRACT

The embodiments of the present application provide an antenna port indication method, a terminal and a network-side device. Said method includes: transmitting a port indication message to a network-side device; and the port indication message carries at least any one of the following port indication information: bitmap information or combination coefficient information for indicating ports selected by a terminal; a first parameter for indicating the ports selected by the terminal; or a second parameter for indicating ports selected by the terminal in a first polarization direction and a third parameter for indicating the ports selected by the terminal in a second polarization direction.

(Continued)

Transmitting a port indication message to a network-side device    101

The embodiments of the present application achieve the indication of ports selected by a terminal.

20 Claims, 3 Drawing Sheets

(51) Int. Cl.
  *H04B 7/08* (2006.01)
  *H04L 1/1607* (2023.01)
(52) U.S. Cl.
  CPC ........... *H04B 7/0802* (2013.01); *H04B 7/086* (2013.01); *H04L 1/1614* (2013.01)
(58) Field of Classification Search
  CPC . H04W 72/21; H04W 72/0446; H04W 92/18; H04B 7/0695; H04B 7/0626; H04B 7/088; H04B 7/0617; H04B 7/0456; H04B 7/0639; H04B 7/0417; H04B 7/06; H04L 5/0048; H04L 5/0053; H04L 5/0051; H04L 5/0023; H04L 5/0094; H04L 5/001; H04L 5/005; H04L 5/0057; H04L 5/14
  USPC ......................................................... 375/262
  See application file for complete search history.

(56) References Cited

U.S. PATENT DOCUMENTS

| | | | | |
|---|---|---|---|---|
| 2015/0263796 A1* | 9/2015 | Nam | ..................... | H04L 5/0094 370/329 |
| 2017/0142688 A1* | 5/2017 | Ioffe | ..................... | H04B 7/0486 |
| 2018/0077683 A1* | 3/2018 | Rico Alvarino | ...... | H04L 5/0023 |
| 2019/0222274 A1 | 7/2019 | Dou et al. | | |
| 2020/0028555 A1 | 1/2020 | Rahman et al. | | |
| 2020/0028718 A1* | 1/2020 | Wang | .................. | H04L 25/0224 |
| 2022/0338229 A1* | 10/2022 | Sengupta | .............. | H04L 5/0094 |

FOREIGN PATENT DOCUMENTS

| | | |
|---|---|---|
| CN | 109802711 A | 5/2019 |
| CN | 110650472 A | 1/2020 |
| JP | 2017506453 A | 3/2017 |
| JP | 2020502837 A | 1/2020 |
| KR | 20170009860 A | 1/2017 |
| WO | 2016141778 A1 | 9/2016 |

OTHER PUBLICATIONS

Japanese Patent Office, 1st Office Action Issued in Application No. 2022-549005, Aug. 14, 2023, 6 pages.
Huawei et al., "Discussion on CSI enhancement", 3GPP TSG RAN WG1 Meeting #98, Prague, Czech Republic, Aug. 26-30, 2019, total 14 pages, R1-1908065.
5G;NR; Physical layer procedures for data, 3GPP TS 38.214 version 15.8.0 Release 15, total 109 pages, Jan. 2021.
Korean Intellectual Property Office, 1st Office Action Issued in Application No. 10-2022-7030899, Jul. 14, 2023, 5 pages.
State Intellectual Property Office of the People's Republic of China, notice of allowance and Search Report Issued in Application No. 202010093931.6, Jun. 19, 2023, 3 pages.
InterDigital Inc.,"Logical Channel Selection Restrictions in LCP", 3GPP TSG-RAN WG2 NR AH#2, Qingdao, P.R. China, Jun. 27-29, 2017, total 4 pages, R2-1706681.
Samsung et al.,"WF on Type I and II CSI codebooks", 3GPP TSG-RAN WG1 #89, Hangzhou, China, May 15-19, 2017, total 24 pages, R1-1709232.
NTT Docomo, Inc.,"HARQ-ACK feedback for CA with up to 32 CCs", 3GPP TSG RAN WG1 Meeting #82, Beijing, China, Aug. 24-28, 2015, total 5 pages, R1-154429.

* cited by examiner

Transmitting a port indication message to a network-side device — 101
FIG. 1
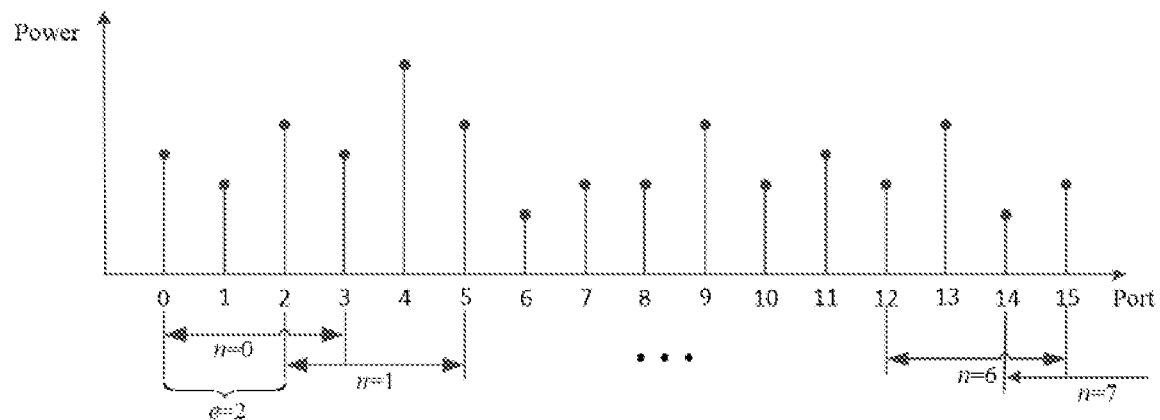
FIG. 2
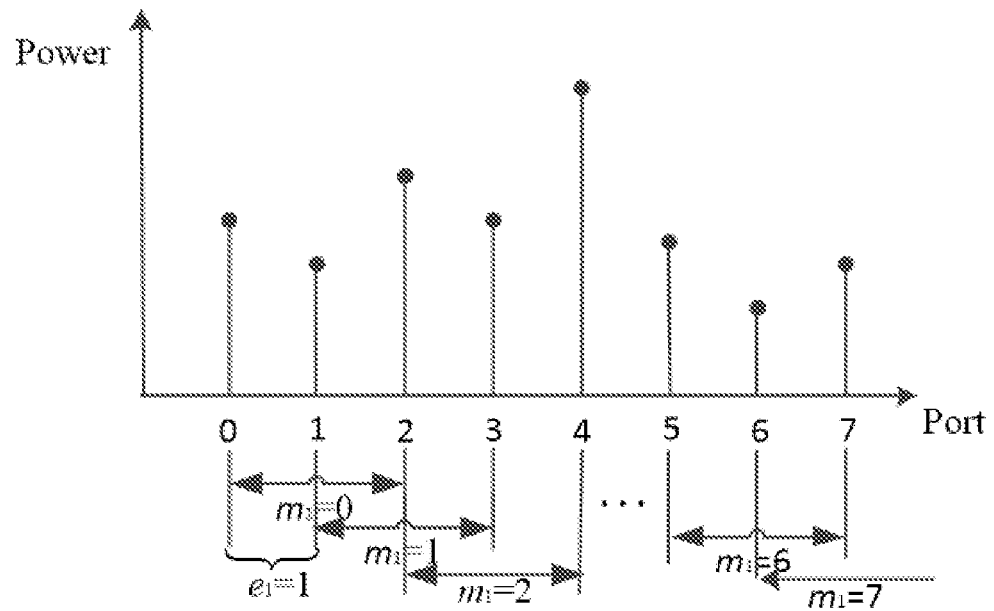
FIG. 3

Receiving a port indication message transmitted by a terminal —— 501

Transmitting device —— 601

Receiving device —— 701

ANTENNA PORT INDICATION METHOD, TERMINAL AND NETWORK-SIDE DEVICE

CROSS-REFERENCE TO RELATED APPLICATION

The present application is a US National Stage of International Application No. PCT/CN2020/136559, filed on Dec. 15, 2020, which claims priority to Chinese application No. 202010093931.6, filed on Feb. 14, 2020, entitled "Antenna Port Indication Method, Terminal and Network-Side Device", which are hereby incorporated by reference in their entireties.

FIELD

The present application relates to the field of communication, and in particular, to an antenna port indication method, a terminal, and a network-side device.

BACKGROUND

In the New Radio (New Radio, NR) version-16 (Rel-16), an enhanced Type II port selection codebook is defined, which can support Ranks=1~4, and a port selection can be implemented by a codebook $W_1$, and a linear merging between ports can be implemented in the same manner as the Rel-16 Type II codebook. In addition, each channel state information reference signal (CSI-RS) port is beamformed, and a formed beam can be determined through reciprocity of uplink channel angle information and downlink channel angle information. Here, the port selection codebook $W_1$ is expressed as follows:

$$W_1 = \begin{bmatrix} E_{\frac{X}{2} \times L} & 0 \\ 0 & E_{\frac{X}{2} \times L} \end{bmatrix}.$$

Where, X represents the number of CSI-RS ports, and the value of X is the same as the antenna configuration supported by the Rel-16 enhanced Type II codebook; the parameter L represents the number of selected consecutive ports, and L is configurable among $\{2, 4\}$ (i.e., $L \in \{2, 4\}$). Further, each port selection block can be expressed as:

$$E_{\frac{X}{2} \times L} = \begin{bmatrix} e^{(\frac{X}{2})}_{mod(md,\frac{X}{2})} & e^{(\frac{X}{2})}_{mod(md+1,\frac{X}{2})} & \cdots & e^{(\frac{X}{2})}_{mod(md+L-1,\frac{X}{2})} \end{bmatrix}.$$

Where, $$e^{(\frac{X}{2})}_i$$

represents a vector with a length of X/2, where i represents a mod function, the i-th element is 1 and the remaining elements are 0; the parameter m represents a starting port of the selected ports, which is configured to select L consecutive ports, and has the value of $$m \in \left\{0, 1, \ldots, \left\lceil \frac{X}{2d} \right\rceil - 1\right\},$$

adopting broadband feedback; the parameter d is configurable among $\{1, 2, 3, 4\}$ (i.e., $d \in \{1, 2, 3, 4\}$) and required to satisfy a condition of $d \leq L$, which is configured to adjust an interval for sampling per L beams and affects the feedback overhead. That is, X/2 ports are divided into X/(2d) groups, which can reduce the feedback overhead for indicating m. At the same time, when selecting d, it is needed to avoid selecting beams having similar direction for linear combining. For the selected L ports, it may calculate a port selection codebook by adopting a Type II codebook structure of Rel-16.

From the above, the port selection indication in the NR Rel-15/16 port selection codebook is used to select L consecutive ports in one polarization direction within X/2 ports by introducing a parameter m, and the same ports in two polarization directions indicate the ports with a same number selected by a terminal, and further, a network configurable parameter d is introduced to further reduce the terminal feedback overhead. However, the port selection indication method which directly adopting NR Rel-15/16 cannot be used for port indication of an NR Rel-17 port selection codebook, that is, for a Rel-17 enhanced port selection codebook, there is not a specific scheme to indicate the ports selected by the terminal.

SUMMARY

The embodiments of the present application provide an antenna port indication method, a terminal and a network-side device, which are used for indicating a selected port for a Rel-17 enhanced port selection codebook.

The embodiments of the present application provide an antenna port indication method, which includes: transmitting a port indication message to a network-side device; wherein the port indication message carries at least any one of the following port indication information: a bitmap information or a combination coefficient information for indicating ports selected by a terminal; a first parameter for indicating the ports selected by the terminal; or a second parameter for indicating ports selected by the terminal in a first polarization direction and a third parameter for indicating ports selected by the terminal in a second polarization direction.

The embodiments of the present application provide an antenna port indication method, which includes: receiving a port indication message transmitted by a terminal; where the port indication message carries at least any one of the following port indication information: a bitmap information or a combination coefficient information for indicating ports selected by a terminal; a first parameter for indicating the ports selected by the terminal; or a second parameter for indicating ports selected by the terminal in a first polarization direction and a third parameter for indicating ports selected by the terminal in a second polarization direction.

The embodiments of the present application provide an antenna port indication device, which include: a transmitting device, which is configured to transmit a port indication message to a network-side device; where the port indication message carries at least any one of the following port indication information: a bitmap information or a combination coefficient information for indicating ports selected by a terminal; a first parameter for indicating the ports selected by the terminal; or a second parameter for indicating ports selected by the terminal in a first polarization direction and a third parameter for indicating ports selected by the terminal in a second polarization direction.

The embodiments of the present application provide an antenna port indication device, which includes: a receiving device, which is configured to receive a port indication message transmitted by a terminal; wherein the port indication message carries at least any one of the following port indication information: a bitmap information or a combination coefficient information for indicating ports selected by a terminal; a first parameter for indicating the ports selected by the terminal; or a second parameter for indicating ports selected by the terminal in a first polarization direction and a third parameter for indicating ports selected by the terminal in a second polarization direction.

The embodiments of the present application provide a terminal, which includes a processor and a memory storing a program that is executable by the processor, and the program, when executed by the processor, causes the processor to perform the steps of the antenna port indication method.

The embodiments of the present application provide a network-side device, which includes a processor and a memory storing a program that is executable by the processor, and the program, when executed by the processor, causes the processor to perform the steps of the antenna port indication method.

An embodiment of the present application provides a non-transitory computer-readable storage medium, having computer program stored therein, and when the computer program is executed by a processor, the steps of the antenna port indication method are implemented.

According to the antenna port indication method, the terminal and the network-side device provided by the embodiments of the present application, by transmitting port indication message to the network-side device, where the port indication message carries the bitmap information or the combination coefficient information for indicating the ports selected by the terminal, or the first parameter for indicating the ports selected by the terminal, or the second parameter for indicating the ports selected by the terminal in the first polarization direction and the third parameter for indicating the ports selected by the terminal in the second polarization direction, the network-side device can directly determine the ports selected by the terminal based on the port indication information carried in the port indication message, and then realizing the indication of the ports selected by the terminal.

BRIEF DESCRIPTION OF THE DRAWINGS

In order to more clearly illustrate the solutions according to the embodiments of the present application or the related art, the accompanying drawings required to be used in the description of the embodiments or the related art will be briefly introduced as follows. It should be noted that the drawings in the following description are part of embodiments of the present application.

FIG. 1 is a flowchart illustrating steps of an antenna port indication method applied to a terminal according to embodiments of the present application.

FIG. 2 is a corresponding diagram when obtaining a first parameter according to embodiments of the present application.

FIG. 3 is a corresponding diagram when obtaining a second parameter according to embodiments of the present application.

DETAILED DESCRIPTION

Figures 4, 5, 6, 7:
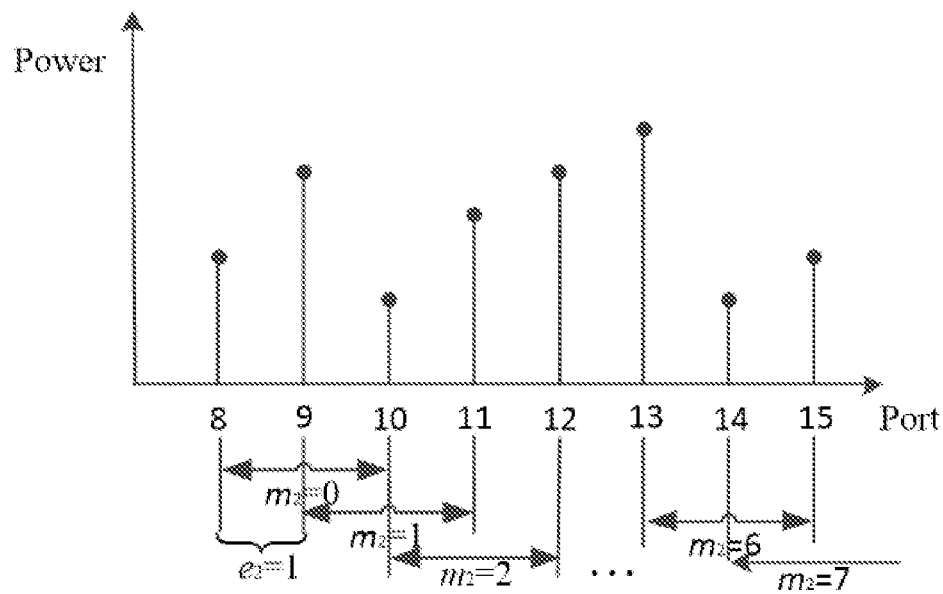
FIG. 4 is a corresponding diagram when obtaining a third parameter according to embodiments of the present application.
FIG. 5 is a flowchart illustrating steps of an antenna port indication method applied to a network-side device according to embodiments of the present application.
FIG. 6 is a device diagram of an antenna port indication device applied to a terminal according to embodiments of the present application.
FIG. 7 is a device diagram of an antenna port indication device applied to a network-side device according to embodiments of the present application.

The embodiments of the present application clearer, embodiments of the present application will be clearly and completely described below in conjunction with the drawings. It should be noted that, the described embodiments are some, but not all embodiments of the present application. Based on the embodiments in the present application, all other embodiments obtained are within the scope of protection of the present application.

In one embodiment, based on a reciprocity of time delay information and angle information of uplink and downlink, NR Rel-17 further enhances Rel-15/16 Type II port selection codebook, and the related precoding method for calculating downlink data transmission includes the following steps: step one, a terminal transmits a channel Sounding Reference Signal (Sounding Reference Signal, SRS) to a network-side device; step two, the network-side device estimates an uplink channel $\hat{H}^{UL}$ based on the received SRS transmitted by the terminal, and calculating the angle information and the time delay information used by each uplink layer based on $\hat{H}^{UL}$, where, the angle information can be represented by several spatial domain compressed base vectors and the time delay information can be represented by several frequency domain compressed base vectors; step three, the network-side device transmits beamformed CSI-RSs to the terminal, where a beamformed CSI-RS is transmitted by each antenna port, and a total of X port beams are transmitted, where the beam transmitted by the transmitting port is obtained by calculating a kronecker product of a spatial domain compressed base vector and a frequency domain compressed base vector; and step four, the terminal receives the beamformed CSI-RS on each port, and by calculating a receiving power of the reference signal on each port, the terminal can select $K_0$ ports corresponding to maximum reference signal receiving power, and report the $K_0$ ports to the network-side device, then the terminal calculates beam combination coefficients on $K_0$ transmission paths according to the selected $K_0$ ports, quantizes the coefficients to obtain $\hat{\beta}_k^{DL}$, k=0, . . . , $K_0$, and reports the quantized coefficients to the network-side device; and step five, the network-side device calculates a precoding W of each downlink layer based on each beam combination coefficient $\hat{\beta}_k^{DL}$ reported by the terminal and $K_0$ ports selected by the terminal, where the beams adopted by $K_0$ ports are calculated based on the angle information and the time delay information of the uplink. Since the time delay information and the angle information of the upper channel and the lower channel have reciprocity, namely the time delay information and the angle information of the uplink and the downlink are equal, the calculation of downlink precoding can use $K_0$ beams of the uplink.

It can be seen from the above, in step four, the terminal needs to select $K_0$ ports and report the $K_0$ ports to the network-side device. But there is currently no scheme for indicating the selected $K_0$ ports. In this regard, the present application provides the following embodiments to indicate the ports selected by the terminal.

In one embodiment, as shown in FIG. 1, which is a flowchart illustrating steps of an antenna port indication method applied to terminal-side according to embodiments of the present application, the method includes the following steps.

Step 101: transmitting a port indication message to a network-side device.

In one embodiment, the port indication message carries at least any one of the following port indication information: a bitmap information or a combination coefficient information for indicating ports selected by a terminal; a first parameter for indicating the ports selected by the terminal; or a second parameter for indicating ports selected by the terminal in a first polarization direction and a third parameter indicating ports selected by the terminal in a second polarization direction.

For example, the terminal transmits the port indication message carrying any one of the above port indication information to the network-side device, then the network-side device can directly determine the ports selected by the terminal based on the port indication information carried in the port indication message, to implement the indication for the ports selected by the terminal and reduce the feedback overhead of the terminal.

Further, when the port indication message carries the bitmap information or the combination coefficient information for indicating the ports selected by the terminal, before transmitting the port indication message to the network-side device, an auxiliary port indication message can be transmitted to the network-side device, where the auxiliary port indication message is determined through a fourth parameter, and the fourth parameter is configured to select L ports, where Z is a positive integer.

Furthermore, in this embodiment, before transmitting the port indication message to the network-side device, the terminal can obtain beamformed CSI-RS, or obtain the beamformed CSI-RS and a frequency domain base vector port indication information; and then, based on the beamformed CSI-RS, or the beamformed CSI-RS and the frequency domain base vector port indication information, obtain the port indication information carried in the port indication message.

In addition, in some embodiment, the following will describe the above port indication information respectively.

First, for example, the port indication information is bitmap information or combination parameter information.

The terminal can determine a size of a bitmap based on the number of spatial domain compressed base vectors and the number of frequency domain compressed base vectors that are configured by network-side or predefined; or, determine a value of the combination parameter based on the maximum number of ports allowed to be selected, the number of spatial domain compressed base vectors and the number of frequency domain compressed base vectors that are configured by network-side or predefined; or, determine the value of the combination parameter based on the number of spatial domain compressed base vectors, the number of frequency domain compressed base vectors that are configured by network-side or predefined and the number of nonzero port combination coefficients reported by the terminal.

In one embodiment, the size of the bitmap can be 2LM, where L represents the number of spatial domain compressed base vectors, and M represents the number of frequency domain compressed base vectors.

Further, the value of the combination parameter can be $$\left\lceil \log_2 \binom{2LM}{K_0} \right\rceil,$$

where $K_0$ represents the maximum number of ports allowed to be selected; or $$\left\lceil \log_2 \binom{2LM}{K_0'} \right\rceil,$$

where $K_0'$ represents the number of nonzero port combination coefficients reported by the terminal.

For example, the ports selected by the terminal can be indicated by one or more bitmaps with a size of 2LM, or by $$\left\lceil \log_2 \binom{2LM}{K_0} \right\rceil$$

bits or $$\left\lceil \log_2 \binom{2LM}{K_0'} \right\rceil$$

bits.

It should be noted that, the values of the parameters L, M and $K_0$ can be configured for the terminal by the network-side device or can be predefined by a protocol.

In addition, the preset mode for marking the ports selected by the terminal can be preset, for example, 1 can be set to indicate the ports selected by the terminal, and 0 can be set to indicate the port that is not selected; which is not limited here.

The above embodiments are exemplified below.

In an example, it is assumed that the network-side device configures the terminal with the number of spatial domain compressed base vectors is 2 (L=2), the number of frequency domain compressed base vectors is 2 (M=2), the maximum number of ports allowed to be selected is 4 ($K_0$=4), and the network-side device transmits one layer of data to the terminal.

The network-side device transmits the beamformed CSI-RS through 2LM=8 ports. At this time, the terminal calculates reference signal received power (Reference Signal Received Power, RSRP) of each port, sorts the 8 RSRPs by their magnitudes, and selects $K_0$=4 RSRPs with the largest power.

In one embodiment, at this time, the port indication information of the ports selected by the terminal can be represented by a bitmap shown as follows.

| | |
|---|---|
| 1 | 0 |
| 0 | 1 |
| 0 | 1 |
| 1 | 0 |

In the above bitmap, it is predefined that 1 represents the ports selected by the terminal, and it is predefined that 0 represents a port that is not selected by the terminal.

Further, the terminal can indicate the selected port by a combination coefficient $$\left\lceil \log_2 \binom{8}{4} \right\rceil = 7 \text{ bits.}$$

Finally, the terminal can transmit the port indication message in which the bitmap information or the combination coefficient information for indicating the ports selected by the terminal (e.g., the bitmap with the size of 8 bits or the combination parameter with the size of 7 bits) can be carried, to the network-side device.

In this way, the terminal implements a direct indication for the ports selected by the terminal through bitmap information or combination parameter information.

Second, for example, an auxiliary port indication message is transmitted to the network-side device.

In one embodiment, the terminal can select L consecutive ports by using the port selection method in NR Rel-15/16, and then determine the final port selected by the terminal through a bitmap information or a combination parameter information.

For example, when selecting the L continuous ports, the terminal selects L continuous ports by a fourth parameter m which is configured to indicate a starting port among the ports selected by the terminal, where $$m \in \left\{ 0, 1, \ldots, \left\lceil \frac{X}{2d} \right\rceil - 1 \right\},$$

d∈{1, 2, 3, 4}, and a condition d≤L should be satisfied, and X represents the number of transmitting ports of the network-side device; then the terminal reports one or more bitmaps with a size of 2LM or an auxiliary information with a size of $$\left\lceil \log_2 \binom{2LM}{K_0} \right\rceil$$

bits for indicating the ports selected by the terminal, where the number of the ports selected by the terminal is no more than $K_0$.

It should be noted that the parameters X, d, L, M, and $K_0$ can be configured for the terminal by the network-side device or predefined by a protocol.

The above embodiments are exemplified below.

In an example, it is assumed that codebook parameters L, M, X, d and $K_0$ configured by the network-side device for the terminal are L=2, M=2, X=16, d=2 and $K_0$=4 and the network-side device transmits one layer of data to the terminal.

The terminal transmits the beamformed CSI-RS by transmitting X/2=8 ports in each polarization direction, and the port indexes are noted as 0, 1, . . . , 7. It may select 2L ports according to the port selection method in Rel-16, namely a port selection block is expressed as:

$$E_{\frac{X}{2} \times L} = \left[ e_i^{\left(\frac{X}{2}\right)} \bmod\left(md, \frac{X}{2}\right) \ e_i^{\left(\frac{X}{2}\right)} \bmod\left(md+1, \frac{X}{2}\right) \ \ldots \ e_i^{\left(\frac{X}{2}\right)} \bmod\left(md+L-1, \frac{X}{2}\right) \right].$$

Where $$e_i^{\left(\frac{X}{2}\right)}$$

represents a vector with a length of X/2, the i-th element of $$e_i^{\left(\frac{X}{2}\right)}$$

is 1 and the remaining elements are 0, and i represents a mod function. It is assumed that the terminal calculates RSRP of each port and the calculated parameter m=2, the indexes of L=2 consecutive ports in the first polarization direction and the second polarization direction are 3 and 4.

Then, the terminal reports a bitmap with a size of 2LM=8 bits for indicating the auxiliary information of the selected $K_0$ ports. The bitmap indication mode can be shown as the following table.

| 1 | 0 |
|---|---|
| 0 | 1 |
| 1 | 0 |
| 0 | 1 |

Where, 1 represents the ports selected by the terminal, and 0 represents the port which is not selected by the terminal.

In one embodiment, the terminal further reports an auxiliary information with $$\left\lceil \log_2 \binom{8}{4} \right\rceil = 7 \text{ bits}$$

for indicating the selected $K_0$ ports.

Finally, the port indication information for indicating the ports selected by the terminal, that is, the bitmap information with the size of 8 bits or the combined parameter information with the size of 7 bits, and the fourth parameter m=2 indicating the starting port among the ports selected by the terminal can be carried in a port indication message, and the terminal can transmit the port indication message to the network-side device.

In this way, the terminal implements the indication for the ports selected by the terminal through the port indication information of the starting port and the bitmap information or the combination parameter information.

Third, when the port indication information is a first parameter for indicating the ports selected by the terminal, before transmitting the port indication message to the network-side device, it may determine a first value range of the first parameter based on the number X of ports transmitted by the network-side device, the number K of the ports selected by the terminal and a sampling interval e for adjusting each K ports; where the first value range is from 0 to $$\left(\left\lceil \frac{X}{e} \right\rceil - 1\right),$$

e is greater than or equal to 1 and less than or equal to K; and then determining the ports selected by the terminal based on the first parameter.

In one embodiment, when determining the ports selected by the terminal based on the first parameter, it may determine an index of a first port among the K ports based on the first parameter, and perform a first modulo operation on the ports number transmitted by the network-side device based on the index of the first port among the K ports and the sampling interval e to determine the indexes of K−1 ports.

The first modulo operation is mod(ne+i, X), where n represents the index of the first port among the K ports and the value range of i is [1, K−1].

In one embodiment, it should be noted that the parameters K, e and X can be configured by the network-side device, and can also be predefined by a protocol, which is not limited herein.

The above embodiments are illustrated by the following specific examples.

In an example, it is assumed that codebook parameters X, e and K configured by the network-side device for the terminal are X=16, e=2 and K=4 and the network-side device transmits one layer of data to the terminal.

As shown in FIG. 2, the network-side device transmits the beamformed CSI-RS through X=16 ports, and the indexes of the ports are denoted as 0, 1, 2, . . . , 15. In addition, based on the number X of ports transmitted by the network-side device, the number K of ports selected by the terminal and the sampling interval e used for adjusting each K ports, the value range of the first parameter is calculated to be 0 to $$\left(\left\lceil \frac{X}{e} \right\rceil - 1\right),$$

i.e. n∈{0, 1, K, 7}. In addition, referring to FIG. 2, after RSRP (corresponding to the vertical Power axis in FIG. 2) of each port is calculated, it can be calculated that the sum of RSRPs corresponding to K consecutive ports is maximal when n=1, and as can be seen from FIG. 2, the ports with indexes 2, 3, 4, and 5 are determined as the ports selected by the terminal. And finally, the terminal reports n=1 as indication information to the network-side device, to make the network-side device determine the K ports selected by the terminal according to the indication information.

Fourth, when the indication information is a second parameter used for indicating the ports selected by the terminal in the first polarization direction and a third parameter used for indicating the ports selected by the terminal in the second polarization direction, before transmitting the port indication message to the network-side device, the method can further include the following steps.

A second value range of the second parameter is determined based on the number X of ports transmitted by the network-side device, the number $K_1$ of ports selected by the terminal in the first polarization direction and a sampling interval $e_1$ used for adjusting each $K_1$ ports; where the second value range is from 0 to $$\left(\left\lceil \frac{X}{2e_1} \right\rceil - 1\right),$$

and $e_1$ is greater than or equal to 1 and less than or equal to $K_1$; a third value range of the third parameter is determined based on the number X of ports transmitted by the network-side device, the number $K_2$ of ports selected by the terminal in the second polarization direction and a sampling interval $e_2$ used for adjusting each $K_2$ ports; where the third value range is from 0 to $$\left(\left\lceil \frac{X}{2e_2} \right\rceil - 1\right),$$

and $e_2$ is greater than or equal to 1 and less than or equal to $K_2$; it may determine the ports selected by the terminal in the first polarization direction based on the second parameter and determine the ports selected by the terminal in the second polarization direction based on the third parameter.

In one embodiment, for example, when determining the ports selected by the terminal in the first polarization direction based on the second parameter and determining the ports selected by the terminal in the second polarization direction based on the third parameter, it may determine an index of a first port in $K_1$ ports based on the second parameter, and perform a second modulo operation on a port transmitted by the network-side device in the first polarization direction based on the index of the first port in $K_1$ ports and the sampling interval $e_1$ to determine the indexes of $K_1$−1 ports; an index of a first port in $K_2$ ports is determined based on the third parameter, and a third modulo operation is performed on a port transmitted by the network-side device in the second polarization direction based on the index of the first port in $K_2$ ports and the sampling interval $e_2$ to determine the indexes of $K_2$−1 ports.

The second modulo operation is mod($n_1e_1+j_1$, X/2), where $n_1$ represents the index of the first port in $K_1$ ports and the value range of $j_1$ is [1, $K_1$−1]; the third modulo operation is mod($n_2e_2+j_2$, X/2), where $n_2$ represents the index of the first port in $K_2$ ports and the value range of $j_2$ is [1, $K_2$−1].

In one embodiment, it should be noted that the parameters X, $K_1$, $K_2$, $e_1$ and $e_2$ can be configured by the network-side device or predefined by a protocol, and are not limited herein.

The above embodiments are illustrated by the following specific examples.

In an example, it is assumed that the codebook parameters X, $e_1$, $e_2$, $K_1$, $K_2$ and K configured by the network-side device for the terminal are X=16, $e_1$=1, $e_2$=1, $K_1$=3, $K_2$=3 and K=6 and the network-side device transmits one layer of data to the terminal.

As shown in FIG. 3, the network-side device transmits the beamformed CSI-RS through X=16 ports, indexes of the ports are denoted as 0, 1, 2, . . . , 15, and the number of ports transmitted by the terminal in the first polarization direction is calculated as X/2=8, and the indexes of the ports are 0, 1, 2, . . . , 7. In addition, based on the number X of ports transmitted by the network-side device, the number $K_1$ of ports selected by the terminal in the first polarization direction and the sampling interval $e_1$ used for adjusting each $K_1$ ports, the maximum value of the second value range of the second parameter $m_1$ is determined to be $$\left\lceil \frac{X}{2e_1} \right\rceil - 1 = 7,$$

that is, $m_1 \in$ {0, 1, K, 7}. In addition, referring to FIG. 3, after RSRP (corresponding to the vertical Power axis in FIG. 3) of each port is calculated, it can be calculated that the sum of RSRPs corresponding to $K_1$ consecutive ports is maximal when $m_1$=2, and as can be seen from FIG. 3, the ports with indexes 2, 3, 4 and 5 are used as the ports selected by the terminal in the first polarization direction.

As shown in FIG. 4, similar to FIG. 3, X/2=8 ports transmitted in the second polarization direction are calculated, and the indexes of the ports are 8, 9, 10, . . . , 15. In addition, based on the number X of ports transmitted by the network-side device, the number $K_2$ of ports selected by the terminal in the second polarization direction and the sampling interval $e_2$ used for adjusting each $K_2$ ports, the maximum value of the third value range of the third parameter $m_2$ is determined to be $$\left\lceil \frac{X}{2e_2} \right\rceil - 1 = 7,$$

that is, it belongs to 1 to 7. Referring to FIG. 4, after RSRP (corresponding to the vertical Power axis in FIG. 4) of each port is calculated, it can be calculated that the sum of RSRPs corresponding to $K_2$ consecutive ports is maximal when $m_2$=3, and it can be seen from FIG. 4 that the ports with indexes 11, 12 and 13 are used as the ports selected by the terminal in the second polarization direction.

Finally, the terminal reports a second parameter $m_1$=2 and a third parameter $m_2$=3 for indicating the ports selected by the terminal to the network-side device, and the network-side device can respectively determine 3 ports selected by the terminal in the first polarization direction and 3 ports selected by the terminal in the second polarization direction according to the parameter information $m_1$=2 and $m_2$=3.

In this way, the terminal performs an indication report of the selected ports in the first polarization direction and the second polarization direction respectively, then the ports and the port numbers selected by the terminal in the two polarization directions can be the same or different, and the indication information for indicating the selected port can be the same or different, to avoid the problem that the same number of ports selected by the terminal can only be indicated by the same ports in the two polarization directions in the related art.

Furthermore, in this embodiment, when performing at least two-layer data transmission and transmitting a port indication message to a network-side device, it may transmit a first port indication message to the network-side device, where the first port indication message carries parameter information of ports selected by the terminal corresponding to all layers; or it may transmit second port indication messages with the same number as the number of the data transmission layers to the network-side device, where each layer corresponds to one second port indication message and each second port indication message carries parameter information of the ports selected by the terminal of the corresponding layer.

That is, for multi-layer data transmission, the selected port corresponding to all layers can be indicated by one port indication message, or the selected port corresponding to each layer can be independently indicated by one port indication message.

The above embodiments are described by the following examples.

In an example, it is assumed that codebook parameters L, M and $K_0$ configured by the network-side device for the terminal are L=2, M=2 and $K_0$=4 and the network-side device transmits two layers of data to the terminal.

The network-side device transmits the beamformed CSI-RS through 2LM=8 ports. The terminal calculates the RSRP of each port. For two-layer data transmission, after 8 RSRPs are sorted by size, the ports corresponding to the $K_0$=4 RSRPs with the largest power are selected, and the selected port can be indicated by a bitmap shown in the following table.

| | |
|---|---|
| 1 | 0 |
| 0 | 1 |
| 0 | 1 |
| 1 | 0 |

Where, 1 in the table represents the ports selected by the terminal and 0 represents the port which is not selected by the terminal. The two layers of data transmission adopt the same indication information for indicating the ports selected by the terminal.

In one embodiment, for the first layer data transmission, the terminal selects $K_0$=4 RSRPs with the largest amplitude among all combination coefficients of the first layer, and the selected port can be indicated by a bitmap shown in the following table.

| | |
|---|---|
| 0 | 1 |
| 1 | 0 |
| 0 | 1 |
| 0 | 1 |

For the second layer data transmission, the terminal selects 4 RSRPs with the largest amplitude among all combination coefficients of the second layer, and the selected port can be indicated by a bitmap shown in the following table.

| | |
|---|---|
| 0 | 0 |
| 1 | 1 |
| 0 | 1 |
| 1 | 0 |

And finally, the terminal reports the parameter information for indicating the selected ports of the two layers to the network-side device.

In this way, in this embodiment, by transmitting the port indication message to the network-side device and the port indication message carrying the indication information for indicating the ports selected by the terminal, it may implement the indication of the ports selected by the terminal, and indicate the ports selected by the terminal with less feedback overhead.

In addition, as shown in FIG. 5, it is a flowchart illustrating steps of an antenna port indication method applied to network-side device according to embodiments of the present application, the method includes the following steps.

Step 501: receiving a port indication message transmitted by a terminal.

In one embodiment, the port indication message carries at least any one of the following port indication information: a bitmap information or a combination coefficient information for indicating ports selected by a terminal; a first parameter for indicating the ports selected by the terminal; or a second parameter for indicating ports selected by the terminal in a first polarization direction and a third parameter indicating ports selected by the terminal in a second polarization direction.

The network-side device receives a port indication message transmitted by the terminal, where the port indication message carries a bitmap information or a combination coefficient information used for indicating the ports selected by the terminal, or a first parameter used for indicating the ports selected by the terminal, or a second parameter used for indicating ports selected by the terminal in a first polarization direction and a third parameter used for indicating ports selected by the terminal in a second polarization direction, and it can be implemented that the ports selected by the terminal can be determined according to the port indication message.

In one embodiment, when the port indication information is bitmap information or combination coefficient information used for indicating the ports selected by the terminal, before receiving the port indication message transmitted by the terminal, an auxiliary port indication message transmitted by the terminal can also be received, where the auxiliary port indication message is determined through a fourth parameter, the fourth parameter is configured to select L ports, and L is a positive integer.

It should be noted that, for the relevant contents of the above indication information, reference can be made to the corresponding part of the terminal side, and details are not described herein again.

Furthermore, in this embodiment, for example, when receiving a port indication message transmitted by a terminal, it may receive a first port indication message transmitted by the terminal, where the first port indication message carries port indication information of ports selected by the terminal corresponding to all layers when the terminal performs at least two-layer data transmission; or it may receive second port indication messages transmitted by the terminal, where each second port indication message carries port indication information of the ports selected by the terminal corresponding to a single layer when the terminal performs at least two-layer data transmission.

It should be noted that, for specific contents of this embodiment, reference can be made to related contents of the terminal side, and details are not described herein again.

In addition, for example, before receiving the port indication message transmitted by the terminal, the network-side device transmits a beamformed CSI-RS, or the beamformed CSI-RS and a frequency domain base vector port indication information to the terminal.

It should be noted that, relevant contents of this embodiment can refer to the terminal side, and are not described in detail herein.

In addition, in some embodiment, after receiving the port indication message transmitted by the terminal, the network-side device can determine the ports selected by the terminal based on the information carried in the port indication message, to realize the identification of the ports selected by the terminal.

For example, in some embodiment, the network-side device can also determine a downlink data transmission precoding of the terminal base on the parameter information.

Thus, in this embodiment, through receiving the port indication message transmitted by the terminal, where the port indication message carries bitmap information or combination coefficient information used for indicating the ports selected by the terminal, or a first parameter used for indicating the ports selected by the terminal, or a second parameter used for indicating ports selected by the terminal in a first polarization direction and a third parameter used for indicating ports selected by the terminal in a second polarization direction, it can be implemented that the ports selected by the terminal is indicated, and the ports selected by the terminal can be determined based on the port indication message.

In addition, as shown in FIG. 6, it is a device diagram of an antenna port indication device applied to terminal-side according to the embodiments of the present application, the device includes: a transmitting device 601, which is configured to transmit a port indication message to a network-side device; where the port indication message carries at least any one of the following port indication information: a bitmap information or a combination coefficient information for indicating ports selected by a terminal; a first parameter for indicating the ports selected by the terminal; or a second parameter for indicating the ports selected by the terminal in a first polarization direction and a third parameter for indicating the ports selected by the terminal in a second polarization direction.

In one embodiment, the antenna port indication device further includes an obtaining device, wherein before transmitting the port indication message to the network-side device, the obtaining device is configured to: obtain a beamformed channel state information reference signal (CSI-RS) or obtain a frequency domain base vector port indication information and the beamformed CSI-RS; and obtain the port indication information carried in the port indication message based on the beamformed CSI-RS, or based on the frequency domain base vector port indication information and the beamformed CSI-RS.

In one embodiment, the antenna port indication device further includes a first determining device, wherein when the port indication information is the bitmap information or the combination parameter information, before transmitting the port indication message to the network-side device, the first determining device is configured to: determine a size of a bitmap based on the number of spatial domain compressed base vectors and the number of frequency domain compressed base vectors configured or predefined by network-side; or, determine a value of the combination parameter based on a maximum number of ports allowed to be selected, the number of spatial domain compressed base vectors and the number of frequency domain compressed base vectors configured or predefined by network-side; or, determine the value of the combination parameter based on the number of spatial domain compressed base vectors, the number of frequency domain compressed base vectors configured or predefined by network-side and the number of nonzero port combination coefficients reported by the terminal.

In one embodiment, the antenna port indication device further includes a second determining device, wherein when the indication information is the first parameter for indicating the ports selected by the terminal, before transmitting the port indication message to the network-side device, the second determining device is configured to: determine a first value range of the first parameter based on the number X of ports transmitted by the network-side device, the number K of ports selected by the terminal and a sampling interval e for adjusting each K ports; wherein the first value range is from 0 to $$\left(\left\lceil \frac{X}{e} \right\rceil - 1\right).$$

e is greater than or equal to 1 and less than or equal to K; determine the ports selected by the terminal based on the first parameter.

In one embodiment, the antenna port indication device further includes a third determining device, wherein when the indication information is the second parameter for indicating the ports selected by the terminal in the first polarization direction and the third parameter for indicating the ports selected by the terminal in the second polarization direction, before transmitting the port indication message to the network-side device, the third determining device is configured to: determine a second value range of the second parameter based on the number X of ports transmitted by the network-side device, the number $K_1$ of ports selected by the terminal in the first polarization direction and a sampling interval $e_1$ used for adjusting each $K_1$ ports; wherein the second value range is from 0 to $$\left(\left\lceil \frac{X}{2e_1} \right\rceil - 1\right),$$

and $e_1$ is greater than or equal to 1 and less than or equal to $K_1$; determine a third value range of the third parameter based on the number X of ports transmitted by the network-side device, the number $K_2$ of ports selected by the terminal in the second polarization direction and a sampling interval $e_2$ used for adjusting each $K_2$ ports; wherein the third value range is from 0 to $$\left(\left\lceil \frac{X}{2e_2} \right\rceil - 1\right),$$

and $e_2$ is greater than or equal to 1 and less than or equal to $K_2$; determine the ports selected by the terminal in the first polarization direction based on the second parameter and determine the ports selected by the terminal in the second polarization direction based on the third parameter.

It should be noted that the device can implement all steps of the method embodiments of the terminal-side, and can achieve the same effect, and details of the same method contents and beneficial effects are not repeated herein.

In addition, as shown in FIG. 7, it is a device diagram of an antenna port indication device applied to network-side device according to the embodiments of the present application, the device includes: a receiving device 701, which is configured to receive a port indication message transmitted by a terminal; where the port indication message carries at least any one of the following port indication information: a bitmap information or a combination coefficient information for indicating ports selected by a terminal; a first parameter for indicating the ports selected by the terminal; or a second parameter for indicating the ports selected by the terminal in a first polarization direction and a third parameter for indicating the ports selected by the terminal in a second polarization direction.

In one embodiment, the antenna port indication device further includes a transmitting device, wherein before receiving the port indication message transmitted by the terminal, the transmitting device is configured to: transmit a beamformed channel state information reference signal (CSI-RS) or a frequency domain base vector port indication information and the beamformed CSI-RS to the terminal.

In one embodiment, the antenna port indication device further includes a determining device, wherein after receiving the port indication message transmitted by the terminal, the determining device is configured to: determine the ports selected by the terminal based on the indication information carried in the port indication message.

It should be noted that the device can implement all steps of the method embodiments of the network-side device side, and can achieve the same effect, and details of the same method contents and beneficial effects are not described herein again.

Figure 8:
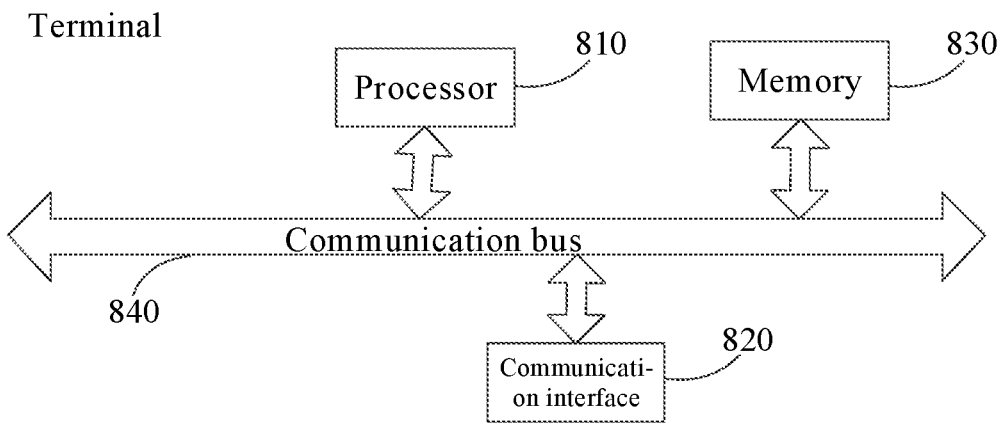
FIG. 8 is a schematic structural diagram of a terminal according to embodiments of the present application.

In addition, as shown in FIG. 8, it is an entity structure schematic diagram of a terminal provided by the embodiments of the present application, the terminal can include: a processor 810, a communication interface 820, a memory 830 and a communication bus 840, where the processor 810, the communication interface 820 and the memory 830 communicate with each other via the communication bus 840. The processor 810 can execute a computer program stored in the memory 830 and executable by the processor 810 to perform the following method, which includes: transmitting a port indication message to a network-side device; where the port indication message carries at least any one of the following port indication information: a bitmap information or a combination coefficient information for indicating ports selected by a terminal; a first parameter for indicating the ports selected by the terminal; or a second parameter for indicating the ports selected by the terminal in a first polarization direction and a third parameter for indicating the ports selected by the terminal in a second polarization direction.

In one embodiment, when the port indication information is the bitmap information or the combination coefficient information for indicating the ports selected by the terminal, before transmitting the port indication message to the network-side device, the method further includes: transmitting an auxiliary port indication message to the network-side device, where the auxiliary port indication message is determined through a fourth parameter, the fourth parameter is configured to select L ports, and L is a positive integer.

In one embodiment, before transmitting the port indication message to the network-side device, the method further includes: obtaining a beamformed channel state information reference signal (CSI-RS), or obtaining a frequency domain base vector port indication information and the beamformed CSI-RS; and obtaining the port indication information carried in the port indication message based on the beamformed CSI-RS, or based on the frequency domain base vector port indication information and the beamformed CSI-RS.

In one embodiment, when the port indication information is the bitmap information or combination parameter information, before transmitting the port indication message to the network-side device, the method further includes: determining a size of the bitmap based on the number of spatial domain compressed base vectors and the number of frequency domain compressed base vectors that are configured by the network-side device or predefined; or, determining a value of the combination parameter based on a maximum number of ports allowed to be selected, the number of spatial domain compressed base vectors and the number of frequency domain compressed base vectors that are configured by the network-side device or predefined; or, determining the value of the combination parameter based on the number of spatial domain compressed base vectors, the number of frequency domain compressed base vectors that are configured by the network-side device or predefined, and the number of nonzero port combination coefficients reported by the terminal.

In one embodiment, when the indication information is the first parameter used for indicating the ports selected by the terminal, before transmitting the port indication message to the network-side device, the method further includes: determining a first value range of the first parameter based on the number X of ports transmitted by the network-side device, the number K of ports selected by the terminal and a sampling interval e for adjusting each K ports; where the first value range is from 0 to $$\left(\left\lceil \frac{X}{e} \right\rceil - 1\right),$$

e is greater than or equal to 1 and less than or equal to K; and determining the ports selected by the terminal based on the first parameter.

In one embodiment, the determining the ports selected by the terminal based on the first parameter includes: determining an index of a first port in K ports based on the first parameter; performing a first modulo operation on the ports number transmitted by the network-side device based on the index of the first port among the K ports and the sampling interval e to determine indexes of K−1 ports; where the first modulo operation is mod(ne+i, X), n represents the index of the first port among the K ports and the value range of i is [1, K−1].

In one embodiment, when the indication information is the second parameter used for indicating the ports selected by the terminal in the first polarization direction and the third parameter used for indicating the ports selected by the terminal in the second polarization direction, before transmitting the port indication message to the network-side device, the method further includes: determining a second value range of the second parameter based on the number X of ports transmitted by the network-side device, the number $K_1$ of ports selected by the terminal in the first polarization direction and a sampling interval $e_1$ used for adjusting each $K_1$ ports; where the second value range is from 0 to $$\left(\left\lceil \frac{X}{2e_1} \right\rceil - 1\right),$$

and $e_1$ is greater than or equal to 1 and less than or equal to $K_1$; determining a third value range of the third parameter based on the number X of ports transmitted by the network-side device, the number $K_2$ of ports selected by the terminal in the second polarization direction and a sampling interval $e_2$ used for adjusting each $K_2$ ports; where the third value range is from 0 to $$\left(\left\lceil \frac{X}{2e_2} \right\rceil - 1\right),$$

and $e_2$ is greater than or equal to 1 and less than or equal to $K_2$; determining the ports selected by the terminal in the first polarization direction based on the second parameter and determining the ports selected by the terminal in the second polarization direction based on the third parameter.

In one embodiment, the determining the ports selected by the terminal in the first polarization direction based on the second parameter and the determining the ports selected by the terminal in the second polarization direction based on the third parameter includes: determining an index of a first port in $K_1$ ports based on the second parameter, and performing a second modulo operation on a port transmitted by the network-side device in the first polarization direction based on the index of the first port in $K_1$ ports and the sampling interval $e_1$ to determine indexes of $K_1$−1 ports; determining an index of a first port in $K_2$ ports based on the third parameter, and performing a third modulo operation on a port transmitted by the network-side device in the second polarization direction based on the index of the first port in $K_2$ ports and the sampling interval $e_2$ to determine indexes of $K_2$−1 ports; where the second modulo operation is mod$(n_1 e_1 + j_1, X/2)$, $n_1$ represents the index of the first port in $K_1$ ports, and the value range of $j_1$ is [1, $K_1$−1]; and the third modulo operation is mod$(n_2 e_2 + j_2, X/2)$, $n_2$ represents the index of the first port in $K_2$ ports, and the value range of $j_2$ is [1, $K_2$−1].

In one embodiment, when performing at least two-layer data transmission, the transmitting the port indication message to the network-side device includes: transmitting a first port indication message to the network-side device, where the first port indication message carries port indication information of ports selected by the terminal corresponding to all layers; or, transmitting second port indication messages with the same number as the number of the data transmission layers to the network-side device, where each layer corresponds to one second port indication message, and each second port indication message carries port indication information of the ports selected by the terminal of the corresponding layer.

It should be noted that the terminal can implement all steps of the method embodiments of the terminal side and can achieve the same effects, and details of the same method contents and beneficial effects are not repeated herein.

In addition, the logic instruction in the memory 830 above can be implemented in the form of software functional unit and can be stored in a computer-readable storage medium when the software functional unit is sold or used as independent product. Based on such understanding, the solution of the present application or a part thereof which substantially contributes to the related art or a part of the solution can be embodied in the form of a software product, which is stored in a storage medium and includes several instructions for causing a computer device (which can be a personal computer, a server, or a network device) to perform all or part of the steps of the method according to the embodiments of the present application. And the aforementioned storage medium includes: USB flash disk, mobile hard disk, Read-Only Memory (ROM), Random Access Memory (RAM), magnetic disk, or compact disk and other media that can store program codes.

Figure 9:
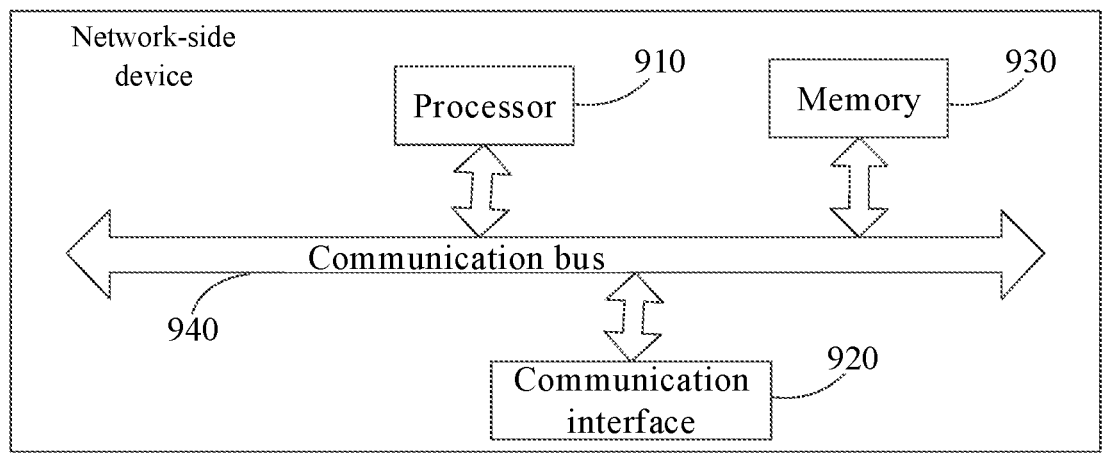
FIG. 9 is a schematic structural diagram of a network-side device according to embodiments of the present application.

In addition, as shown in FIG. 9, it is an entity structure schematic diagram of a network-side device provided by the embodiments of the present application, the network-side device can include: a processor 910, a communications interface 920, a memory 930 and a communication bus 940, where the processor 910, the communication interface 920 and the memory 930 are communication with each other via the communication bus 940. The processor 910 can execute a computer program stored in the memory 930 and executable by the processor 910 to perform the following method, which includes: receiving a port indication message transmitted by a terminal; where the port indication message carries at least any one of the following port indication information: a bitmap information or a combination coefficient information for indicating ports selected by a terminal; a first parameter for indicating the ports selected by the terminal; or a second parameter for indicating the ports selected by the terminal in a first polarization direction and a third parameter for indicating the ports selected by the terminal in a second polarization direction.

In one embodiment, when the port indication information is bitmap information or combination coefficient information for indicating the ports selected by the terminal, before receiving the port indication message transmitted by the terminal, the method further includes: receiving an auxiliary port indication message transmitted by the terminal, where the auxiliary port indication message is determined through a fourth parameter, the fourth parameter is configured to select L ports, and L is a positive integer.

In one embodiment, after receiving the port indication message transmitted by the terminal, the method further includes: determining the ports selected by the terminal based on the indication information carried in the port indication message.

In one embodiment, the receiving the port indication message transmitted by the terminal includes: receiving a first port indication message transmitted by the terminal, where the first port indication message carries port indication information of ports selected by the terminal corresponding to all layers when the terminal performs at least two-layer data transmission; or receiving second port indication messages transmitted by the terminal, where each second port indication message carries port indication information of the ports selected by the terminal corresponding to a single layer when the terminal performs at least two-layer data transmission.

Furthermore, the logic instruction in the memory 930 above can be implemented in the form of software functional unit and can be stored in a computer-readable storage medium when the software functional unit is sold or used as independent product. Based on such understanding, the solution of the present application or a part thereof which substantially contributes to the prior art or a part of the solution can be embodied in the form of a software product, which is stored in a storage medium and includes several instructions for causing a computer device (which can be a personal computer, a server, or a network device) to perform all or part of the steps of the method according to the embodiments of the present application. And the aforementioned storage medium includes: a USB flash disk, mobile hard disk, Read-Only Memory (ROM), Random Access Memory (RAM), magnetic disk, or compact disk and other media that can store program codes.

An embodiment of the present application provides a non-transitory computer-readable storage medium, having computer program stored therein, and when the computer program is executed by a processor, the methods provided in the foregoing embodiments can be performed, and the same effects can be can achieved, which are not described herein again.

The above-described embodiments of the device are merely illustrative, and the devices or devices described as separate parts may or may not be physically separated, and parts displayed as devices or devices may or may not be physical devices or devices, namely they may be either located in one position, or may be distributed to multiple network devices. Some or all of the devices or devices may be selected according to actual needs to achieve these embodiments.

From the above description of the embodiments, each embodiment can be implemented by means of software plus a necessary general hardware platform, and can also be implemented by hardware. Based on such understanding, the above solutions substantially or otherwise contributing to the related art can be embodied in the form of a software product, which can be stored in a computer-readable storage medium, such as ROM/RAM, magnetic disk, compact disk, etc., and can include several instructions for causing a computer device (which can be a personal computer, a server, or a network device, etc.) to execute the methods according to the various embodiments or some parts of the embodiments.

It should be noted that the above-mentioned embodiments are only intended to illustrate the solutions of the present application, and not to limit it; although the present application has been described in detail with reference to the foregoing embodiments, it should be understood the solutions in the foregoing embodiments can be still modified and equivalent substitutions are made to a part of the features; these modifications and substitutions do not make the essence of the corresponding solutions depart from the scope of the solutions of various embodiments of the present application.

What is claimed is:

1. An antenna port indication method, comprising:
    transmitting a port indication message to a network-side device; wherein the port indication message carries at least any one of the following port indication information:
    bitmap information or combination coefficient information for indicating ports selected by a terminal;
    a first parameter for indicating the ports selected by the terminal, wherein a first value range of the first parameter is determined based on the number X of transmission ports of the network-side device, the number K of ports selected by the terminal and a sampling interval e for adjusting each K ports; or
    a second parameter for indicating the ports selected by the terminal in a first polarization direction and a third parameter for indicating the ports selected by the terminal in a second polarization direction.

2. The method of claim 1, wherein when the port indication information is the bitmap information or the combination coefficient information for indicating the ports selected by the terminal, before transmitting the port indication message to the network-side device, the method further comprises:
    transmitting an auxiliary port indication message to the network-side device, wherein the auxiliary port indication message is determined through a fourth parameter, the fourth parameter is configured to select L ports, and L is a positive integer.

3. The method of claim 1, wherein before transmitting the port indication message to the network-side device, the method further comprises:
    obtaining a beamformed channel state information reference signal (CSI-RS) or obtaining the beamformed CSI-RS and a frequency domain base vector port indication information; and
    obtaining the port indication information carried in the port indication message based on the beamformed CSI-RS, or based on the frequency domain base vector port indication information and the beamformed CSI-RS.

4. The method of claim 1, wherein when the port indication information is the bitmap information or the combination coefficient information, before transmitting the port indication message to the network-side device, the method further comprises:
    determining a size of a bitmap based on the number of spatial domain compressed base vectors and the number of frequency domain compressed base vectors that are configured by the network-side device or predefined, or determining a value of the combination coefficient based on a maximum number of ports allowed to be selected, the number of spatial domain compressed base vectors and the number of frequency domain compressed base vectors that are configured by network-side or predefined, or determining the value of the combination coefficient based on the number of spatial domain compressed base vectors, the number of frequency domain compressed base vectors that are configured by network-side or predefined and the number of nonzero port combination coefficients reported by the terminal.

5. The method of claim 1, wherein when the port indication information is the first parameter for indicating the ports selected by the terminal, before transmitting the port indication message to the network-side device, the method further comprises:

determining the first value range of the first parameter; wherein the frst value range is from 0 to $$\left(\left\lceil\frac{X}{e}\right\rceil-1\right),$$

e is greater than or equal to 1 and less than or equal to K; and determining the ports selected by the terminal based on the first parameter;

wherein the determining the ports selected by the terminal based on the first parameter comprises:

determining an index of a first port among the K ports based on the first parameter; and performing a first modulo operation on the number of transmission ports of the network-side device based on the index of the first port among the K ports and the sampling interval e, to determine indexes of K−1 ports; and the first modulo operation is mod(ne+i, X), wherein n represents the first parameter and the value range of i is [1, K−1].

6. The method of claim 1, wherein when the port indication information is the second parameter for indicating the ports selected by the terminal in the first polarization direction and the third parameter for indicating the ports selected by the terminal in the second polarization direction, before transmitting the port indication message to the network-side device, the method further comprises:

determining a second value range of the second parameter based on the number X of transmission ports of the network-side device, the number $K_1$ of ports selected by the terminal in the first polarization direction and a sampling interval $e_1$ used for adjusting each $K_1$ ports; wherein the second value range is from 0 to $$\left(\left\lceil\frac{X}{2e_1}\right\rceil-1\right),$$

and $e_1$ is greater than or equal to 1 and less than or equal to $K_1$;

determining a third value range of the third parameter based on the number X of transmission ports of the network-side device, the number $K_2$ of ports selected by the terminal in the second polarization direction and a sampling interval $e_2$ used for adjusting each $K_2$ ports; wherein the third value range is from 0 to $$\left(\left\lceil\frac{X}{2e_2}\right\rceil-1\right),$$

and $e_2$ is greater than or equal to 1 and less than or equal to $K_2$; and determining the ports selected by the terminal in the first polarization direction based on the second parameter and determining the ports selected by the terminal in the second polarization direction based on the third parameter;

wherein the determining the ports selected by the terminal in the first polarization direction based on the second parameter and the determining the ports selected by the terminal in the second polarization direction based on the third parameter comprises:

determining an index of a first port among $K_1$ ports based on the second parameter, and performing a second modulo operation on a port transmitted by the network-side device in the first polarization direction based on the index of the first port among the $K_1$ ports and the sampling interval $e_1$ to determine indexes of $K_1-1$ ports;

determining an index of a first port among $K_2$ ports based on the third parameter, and performing a third modulo operation on a port transmitted by the network-side device in the second polarization direction based on the index of the first port among the $K_2$ ports and the sampling interval $e_2$ to determine indexes of $K_2-1$ ports;

wherein the second modulo operation is $mod(n_1e_1+j_1, X/2)$, $n_1$ represents the second parameter, and the value range of $j_1$ is $[1, K_1-1]$; and the third modulo operation is $mod(n_2e_2+j_2, X/2)$, $n_2$ represents the third parameter, and the value range of $j_2$ is $[1, K_2-1]$.

7. The method of claim 1, wherein when performing at least two-layer data transmission, the transmitting the port indication message to the network-side device comprises:

transmitting a first port indication message to the network-side device, wherein the first port indication message carries port indication information of ports selected by the terminal corresponding to all layers; or transmitting second port indication messages with the same number as the number of data transmission layers to the network-side device, wherein each layer corresponds to one second port indication message, and each of the second port indication message carries port indication information of the ports selected by the terminal of a corresponding layer.

8. An antenna port indication method, comprising:

receiving a port indication message transmitted by a terminal; wherein the port indication message carries at least any one of the following port indication information:

a bitmap information or a combination coefficient information for indicating ports selected by a terminal;

a first parameter for indicating the ports selected by the terminal, wherein a first value range of the first parameter is determined based on the number X of transmission ports of the network-side device, the number K of ports selected by the terminal and a sampling interval e for adjusting each K ports; or a second parameter for indicating ports selected by the terminal in a first polarization direction and a third parameter for indicating ports selected by the terminal in a second polarization direction.

9. The method of claim 8, wherein when the port indication information is the bitmap information or the combination coefficient information for indicating the ports selected by the terminal, before receiving the port indication message transmitted by the terminal, the method further comprises:

receiving an auxiliary port indication message transmitted by the terminal, wherein the auxiliary port indication message is determined through a fourth parameter, the fourth parameter is configured to select L ports, and L is a positive integer; or before receiving the port indication message transmitted by the terminal, the method further comprises:

transmitting a beamformed channel state information reference signal (CSI-RS) or a frequency domain base vector port indication information and the beamformed CSI-RS to the terminal; or after receiving the port indication message transmitted by the terminal, the method further comprises:

determining the ports selected by the terminal based on the indication information carried in the port indication message.

10. The method of claim 8, wherein the receiving the port indication message transmitted by the terminal comprises:

receiving a first port indication message transmitted by the terminal, wherein the first port indication message carries port indication information of ports selected by the terminal corresponding to all layers when the terminal performs at least two-layer data transmission; or receiving second port indication messages transmitted by the terminal, wherein each of the second port indication messages carries port indication information of the ports selected by the terminal corresponding to a single layer when the terminal performs at least two-layer data transmission.

11. A terminal, comprising:
a processor; and
a memory storing a program that is executable by the processor, wherein the program, when executed by the processor, causes the processor to perform the following step:

transmitting a port indication message to a network-side device; wherein the port indication message carries at least any one of the following port indication information:

a bitmap information or a combination coefficient information for indicating ports selected by a terminal;

a first parameter for indicating the ports selected by the terminal, wherein a first value range of the first parameter is determined based on the number X of transmission ports of the network-side device, the number K of ports selected by the terminal and a sampling interval e for adjusting each K ports; or a second parameter for indicating ports selected by the terminal in a first polarization direction and a third parameter for indicating ports selected by the terminal in a second polarization direction.

12. The terminal of claim 11, wherein when the port indication information is the bitmap information or the combination coefficient information for indicating the ports selected by the terminal, before transmitting the port indication message to the network-side device, the program, when executed by the processor, causes the processor to further perform the following step:

transmitting an auxiliary port indication message to the network-side device, wherein the auxiliary port indication message is determined through a fourth parameter, the fourth parameter is configured to select L ports, and L is a positive integer.

13. The terminal of claim 11, wherein before transmitting the port indication message to the network-side device, the program, when executed by the processor, causes the processor to further perform the following steps:

obtaining a beamformed channel state information reference signal (CSI-RS) or obtaining a frequency domain base vector port indication information and the beamformed CSI-RS; and obtaining the port indication information carried in the port indication message based on the beamformed CSI-RS, or based on the frequency domain base vector port indication information and the beamformed CSI-RS.

14. The terminal of claim 11, wherein when the port indication information is the bitmap information or the combination coefficient information, before transmitting the port indication message to the network-side device, the program, when executed by the processor, causes the processor to further perform the following steps:

determining a size of a bitmap based on the number of spatial domain compressed base vectors and the number of frequency domain compressed base vectors that are configured by the network-side device or predefined; or determining a value of the combination coefficient based on a maximum number of ports allowed to be selected, the number of spatial domain compressed base vectors and the number of frequency domain compressed base vectors that are configured by the network-side device or predefined; or determining the value of the combination coefficient based on the number of spatial domain compressed base vectors, the number of frequency domain compressed base vectors that are configured by the network-side device or predefined and the number of nonzero port combination coefficients reported by the terminal.

15. The terminal of claim 11, wherein when the port indication information is the first parameter for indicating the ports selected by the terminal, before transmitting the port indication message to the network-side device, the program, when executed by the processor, causes the processor to further perform the following steps:

determining the first value range of the first parameter; wherein the first value range is from 0 to $$\left(\left\lceil \frac{X}{e} \right\rceil - 1\right),$$

e is greater than or equal to 1 and less than or equal to K; and determining the ports selected by the terminal based on the first parameter; or the determining the ports selected by the terminal based on the first parameter comprises:

determining an index of a first port among the K ports based on the first parameter; and performing a first modulo operation on the number of transmission ports of the network-side device based on the index of the first port among the K ports and the sampling interval e to determine indexes of K−1 ports;

wherein the first modulo operation is mod(ne+i, X), wherein n represents the first parameter and the value range of i is [1, K−1].

16. The terminal of claim 11, wherein when the port indication information is the second parameter for indicating the ports selected by the terminal in the first polarization direction and the third parameter for indicating the ports selected by the terminal in the second polarization direction, before transmitting the port indication message to the network- side device, the program, when executed by the processor, causes the processor to further perform the following steps:

determining a second value range of the second parameter based on the number X of transmission ports of the network-side device, the number $K_1$ of ports selected by the terminal in the first polarization direction and a sampling interval $e_1$ used for adjusting each $K_1$ ports; wherein the second value range is from 0 to $$\left(\left\lceil \frac{X}{2e_1} \right\rceil - 1\right),$$

and $e_1$ is greater than or equal to 1 and less than or equal to $K_1$;

determining a third value range of the third parameter based on the number X of transmission ports of the network-side device, the number $K_2$ of ports selected by the terminal in the second polarization direction and a sampling interval $e_2$ used for adjusting each $K_2$ ports; wherein the third value range is from 0 to $$\left(\left\lceil \frac{X}{2e_2} \right\rceil - 1\right),$$

and $e_2$ is greater than or equal to 1 and less than or equal to $K_2$; and determining the ports selected by the terminal in the first polarization direction based on the second parameter and determining the ports selected by the terminal in the second polarization direction based on the third parameter; or the determining the ports selected by the terminal in the first polarization direction based on the second parameter and the determining the ports selected by the terminal in the second polarization direction based on the third parameter comprises:

determining an index of a first port in $K_1$ ports based on the second parameter, and performing a second modulo operation on a port transmitted by the network-side device in the first polarization direction based on the index of the first port among the $K_1$ ports and the sampling interval $e_1$ to determine indexes of $K_1-1$ ports; and determining an index of a first port in $K_2$ ports based on the third parameter, and performing a third modulo operation on a port transmitted by the network-side device in the second polarization direction based on the index of the first port among the $K_2$ ports and the sampling interval $e_2$ to determine indexes of $K_2-1$ ports;

wherein the second modulo operation is mod($m_1e_1+j_1$, X/2), $n_1$ represents the second parameter, and the value range of $j_1$ is [1, $K_1-1$]; and wherein the third modulo operation is mod($n_2e_2+j_2$, X/2), $n_2$ represents the third parameter, and the value range of $j_2$ is [1, $K_2-1$].

17. The terminal of claim 11, wherein when performing at least two-layer data transmission, the transmitting the port indication message to the network-side device comprises:

transmitting a first port indication message to the network-side device, wherein the first port indication message carries port indication information of ports selected by the terminal corresponding to all layers; or transmitting second port indication messages with the same number as the number of data transmission layers to the network-side device, wherein each layer corresponds to one second port indication message, and each of the second port indication message carries port indication information of the ports selected by the terminal of a corresponding layer.

18. A network-side device, comprising:

a processor; and a memory storing a program that is executable by the processor, wherein the program, when executed by the processor, causes the network-side device to perform the step of claim 8.

19. The network-side device of claim 18, wherein when the port indication information is the bitmap information or the combination coefficient information for indicating the ports selected by the terminal, before receiving the port indication message transmitted by the terminal, the program, when executed by the processor, causes the network- side device to further perform the following step:

receiving an auxiliary port indication message transmitted by the terminal, wherein the auxiliary port indication message is determined through a fourth parameter, the fourth parameter is configured to select L ports, and L is a positive integer; or before receiving the port indication message transmitted by the terminal, the program, when executed by the processor, causes the network-side device to further perform the following step:

transmitting a beamformed channel state information reference signal (CSI-RS) or a frequency domain base vector port indication information and the beamformed CSI-RS to the terminal; or after receiving the port indication message transmitted by the terminal, the program, when executed by the processor, causes the network-side device to further perform the following step:

determining the ports selected by the terminal based on the indication information carried in the port indication message.

20. The network-side device of claim 18, wherein the receiving the port indication message transmitted by the terminal comprises:

receiving a first port indication message transmitted by the terminal, wherein the first port indication message carries port indication information of ports selected by the terminal corresponding to all layers when the terminal performs at least two-layer data transmission; or receiving second port indication messages transmitted by the terminal, wherein each of the second port indication messages carries port indication information of the ports selected by the terminal corresponding to a single layer when the terminal performs at least two-layer data transmission.

* * * * *